US011532059B2

(12) United States Patent
Baker et al.

(10) Patent No.: US 11,532,059 B2
(45) Date of Patent: Dec. 20, 2022

(54) GEO-SPATIAL ANALYSIS TO DETERMINE BOUNDARIES OF TRAFFIC REGIONS AND CLASSIFICATIONS OF THE BOUNDARIES FOR CONTROLLING DROP-OFF/PICK-UP TRAFFIC

(71) Applicant: INTERNATIONAL BUSINESS MACHINES CORPORATION, Armonk, NY (US)

(72) Inventors: Ronald Bruce Baker, Austin, TX (US); Jeffrey Mark Achtermann, Travis, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 96 days.

(21) Appl. No.: 16/853,738

(22) Filed: Apr. 20, 2020

(65) Prior Publication Data

US 2021/0327010 A1    Oct. 21, 2021

(51) Int. Cl.
*G06Q 10/00*   (2012.01)
*G06Q 50/26*   (2012.01)
(Continued)

(52) U.S. Cl.
CPC ............. *G06Q 50/26* (2013.01); *G06F 16/29* (2019.01); *G06Q 30/0205* (2013.01)

(58) Field of Classification Search
None
See application file for complete search history.

(56) References Cited

U.S. PATENT DOCUMENTS 5,508,931 A * 4/1996 Snider .................... G01C 21/30
701/446
6,459,986 B1 * 10/2002 Boyce ................ G01C 21/3438
701/465
(Continued)

FOREIGN PATENT DOCUMENTS

WO    WO-2019023324 A1 *  1/2019   ............. B60N 2/002

OTHER PUBLICATIONS

Seyed Mohammad Nourbakhsh and Yanfeng Ouyang (A structured flexible transit system for low demand areas, Transportation Research Part B 46 (2012) 204-216). (Year: 2012).*

(Continued)

*Primary Examiner* — Hafiz A Kassim
(74) *Attorney, Agent, or Firm* — Konrad Raynes Davda & Victor LLP; David W. Victor

(57) ABSTRACT

Provided are a computer program product, system, and method for geo-spatial analysis to determine boundaries of traffic regions and classifications of the boundaries for controlling drop-off/pick-up traffic. A determination is made of drop-off/pick-up points for vehicles in traffic regions in which vehicles dropped-off and/or picked-up passengers. Geo-spatial cluster analysis is applied to the determined drop-off/pick-up points to determine boundaries of the traffic regions having drop-off/pick-up points forming clusters of similar drop-off/pick-up point densities. A determination is made of a respective classification for each respective one of the boundaries. Each respective classification indicates a relative density of drop-off/pick-up points in its respective boundary relative to densities of drop-off/pick-up points in other one of the boundaries. Classification related information based on the determined classifications is communicated to use to control drop-off/pick-up traffic in the traffic regions.

16 Claims, 8 Drawing Sheets

(51) Int. Cl.
*G06Q 30/02* (2012.01)
*G06F 16/29* (2019.01)

(56) References Cited

U.S. PATENT DOCUMENTS

| | | | | |
|---|---|---|---|---|
| 6,941,197 | B1* | 9/2005 | Murakami | B60L 53/305 |
| | | | | 701/22 |
| 9,251,277 | B2 | 2/2016 | Hampapur et al. | |
| 9,562,785 | B1* | 2/2017 | Racah | G01C 21/343 |
| 9,761,140 | B2 | 9/2017 | Rosas-Maxemin et al. | |
| 10,459,440 | B2 | 10/2019 | Rust et al. | |
| 2006/0059023 | A1* | 3/2006 | Mashinsky | G06Q 10/02 |
| | | | | 705/5 |
| 2006/0242154 | A1* | 10/2006 | Rawat | G06F 16/168 |
| 2009/0216600 | A1* | 8/2009 | Hill | G06Q 50/30 |
| | | | | 705/7.14 |
| 2010/0185388 | A1* | 7/2010 | Horvitz | G01C 21/34 |
| | | | | 701/465 |
| 2012/0041675 | A1* | 2/2012 | Juliver | G06Q 30/0283 |
| | | | | 701/465 |
| 2013/0024060 | A1* | 1/2013 | Sukkarie | G01C 21/26 |
| | | | | 701/22 |
| 2013/0218455 | A1* | 8/2013 | Clark | G06Q 50/30 |
| | | | | 701/411 |
| 2013/0317742 | A1* | 11/2013 | Ulloa Paredes | G06Q 50/30 |
| | | | | 701/533 |
| 2014/0164389 | A1* | 6/2014 | Hampapur | G06F 16/9537 |
| | | | | 707/743 |
| 2014/0201266 | A1* | 7/2014 | Jackson | G08G 1/0175 |
| | | | | 709/224 |
| 2015/0161533 | A1* | 6/2015 | Kawamoto | G06Q 50/30 |
| | | | | 705/7.12 |
| 2015/0254581 | A1* | 9/2015 | Brahme | G06F 16/29 |
| | | | | 705/5 |
| 2015/0310378 | A1* | 10/2015 | Van Der Berg | G06Q 50/30 |
| | | | | 705/7.15 |
| 2016/0261984 | A1* | 9/2016 | Shrinath | H04W 4/021 |
| 2016/0370194 | A1* | 12/2016 | Colijn | G01C 21/34 |
| 2017/0169366 | A1* | 6/2017 | Klein | G06Q 50/30 |
| 2017/0169535 | A1* | 6/2017 | Tolkin | G06Q 10/06311 |
| 2017/0270447 | A1* | 9/2017 | Borean | G06Q 10/06313 |
| 2017/0365030 | A1* | 12/2017 | Shoham | G06Q 10/02 |
| 2018/0032928 | A1* | 2/2018 | Li | G06Q 10/02 |
| 2018/0156623 | A1* | 6/2018 | West | G01C 21/3423 |
| 2018/0342033 | A1* | 11/2018 | Kislovskiy | G01C 21/3697 |
| 2019/0056233 | A1* | 2/2019 | Liu | G01C 21/3423 |
| 2019/0095514 | A1* | 3/2019 | Anastassov | G06F 16/29 |
| 2019/0113927 | A1* | 4/2019 | England | G05D 1/0231 |
| 2019/0212159 | A1 | 7/2019 | Petersen et al. | |
| 2020/0209873 | A1* | 7/2020 | Chen | G01C 21/3822 |
| 2021/0285777 | A1* | 9/2021 | Ostadzadeh | G01C 21/3617 |

OTHER PUBLICATIONS

Meng-Fen Chiang, Ee-Peng Lim, Wang-Chien Lee, and Tuan-Anh Hoang (Inferring Trip Occupancies in the Rise of Ride-Hailing Services, CIKM'18, Oct. 22-26, 2018, Torino, Italy) (Year: 2018).*
Andreas Keler, Jukka M. Krisp and Linfang Ding (Detecting vehicle traffic patterns in urban environments using taxi trajectory intersection points, Geo-spatial Information Science, 2017) (Year: 2017).*
Matthew J. Roorda, Juan A. Carrasco, Eric J. Miller (An integrated model of vehicle transactions, activity scheduling and mode choice, Transportation Research Part B 43 (2009) 217-229)). (Year: 2009).*
Albalate, D., et al., "The Determinants of Garage Prices and Their Interaction With Curbside Regulation", Transportation Research Part A, 101, Available online May 12, 2017, 12 pp.
Albalate, D., et al., "The Price to Park: Assessing the Determinants of Garage Prices and Their Interaction with Curbside Regulation", Working paper, University of Barcelona, Jan. 2016, 24 pp.
Barth, B., "Curb Control", [online], Jun. 2019, [Retrieved on Mar. 3, 2020], Retrieved from the Internet at <URL: https://www.planning.org/planning/2019/jun/curbcontrol/>, 16 pp.
Brooks, R., "How Should Cities Price Access to Their Curb Spaces and Right-of-Way?", [online] Posted Apr. 5, 2018, [Retrieved on Mar. 2, 2020], Retrieved from the Internet at <URL: http://t4america.org/2018/04/05/cities-determine-value-price-access-curb . . . >, 5 pp.
Goldsmith, S., "Cashing in on the Curb", [online], Jul. 24, 2018, [Retrieved on Mar. 2, 2020] Retrieved from the Internet at <URL: https://www.governing.com/blogs/bfc/col-smart-cities-data-curb-sidewa . . . >, 2 pp.
Madsen, E., et al., "A Model for Estimation of the Demand for On-Street Parking", [online] Dec. 16, 2013, Munich Personla RePEc Archive, MRPA Paper No. 52316, Retrieved from the Internet at <URL: https://mpra.ub.uni-muenchen.de/52361/>, 24 pp.
Min, W., et al., "Road Traffic Prediction with Spatio-Temporal Correlations", IBM Corporation, RC24275, Jun. 5, 2007, 12 pp.
Mitman, M.F., et al., "Curbside Management Practitioners Guide", Institute of Transportation Engineers (ITE), downloaded Feb. 19, 2020, 50 pp.
Nourinejad, M., et al., "Truck Parking in Urban Areas: Application of Choice Modeling Within Traffic Microsimulation", Transportation Research Part A, 64, Available online Apr. 16, 2014, 11 pp.
Xing, S., et al., "Mining Trajectories for Spatio-Temporal Analytics", Proceedings of the 2012 IEEE 12th International Conference on Data Mining Workshops, Dec. 2012, 4 pp.
Zakharenko, R., "The Time Dimension of Parking Economics", Transportation Research Part B, 91, Accepted Apr. 8, 2016, 18 pp.
Zhou, D., et al., "Identification of Taxi Pick-Up and Drop-Off Hotspots Using the Density-Based Spatial Clustering Method", 17th COTA International Conference of Transportation Professionals, Conference Paper Jan. 2018, 10 pp.

* cited by examiner

Cost Map

Boundary Classification

GEO-SPATIAL ANALYSIS TO DETERMINE BOUNDARIES OF TRAFFIC REGIONS AND CLASSIFICATIONS OF THE BOUNDARIES FOR CONTROLLING DROP-OFF/PICK-UP TRAFFIC

BACKGROUND OF THE INVENTION

1. Field of the Invention

The present invention relates to a computer program product, system, and method for geo-spatial analysis to determine boundaries of traffic regions and classifications of the boundaries for controlling drop-off/pick-up traffic.

2. Description of the Related Art

Geo-spatial analysis has been used to analyze vehicle trajectories to determine information on traffic activities of vehicles, including drop-off/pick-up activity. The geo-spatial analysis may be used to determine hot spots of traffic activity within different traffic regions. City planners may review the analysis of traffic hot spots and develop traffic planning strategies for the hotspots to optimize traffic flow throughout the city.

SUMMARY

Provided are a computer program product, system, and method for geo-spatial analysis to determine boundaries of traffic regions and classifications of the boundaries for controlling drop-off/pick-up traffic. A determination is made of drop-off/pick-up points for vehicles in traffic regions in which vehicles dropped-off and/or picked-up passengers. Geo-spatial cluster analysis is applied to the determined drop-off/pick-up points to determine boundaries of the traffic regions having drop-off/pick-up points forming clusters of similar drop-off/pick-up point densities. A determination is made of a respective classification for each respective one of the boundaries. Each respective classification indicates a relative density of drop-off/pick-up points in its respective boundary relative to densities of drop-off/pick-up points in other one of the boundaries.

Classification related information based on the determined classifications is communicated to use to control drop-off/pick-up traffic in the traffic regions.

DETAILED DESCRIPTION

Described embodiments provide improvements to computer technology for using geo-spatial analysis of drop-off/pick-up points to determine boundaries of traffic regions based on density of drop-off/pick-up points. The described embodiments classify the boundaries based on their density. The classification information may then be used to provide information on classifications of the boundaries to assist users in determining a boundary for a vehicle drop-off/pick-up in the boundary and to determine costs related to the boundaries that may be used for a drop-off/pick-up. For instance, the classifications for determined boundaries may be provided to a user, such as a passenger in a vehicle, driver of a ride sharing vehicle, or user looking to drop-off/pick-up a vehicle in a boundary (e.g., a bicycle or scooter), to use to determine a boundary for a drop-off/pick-up.

Figure 1:
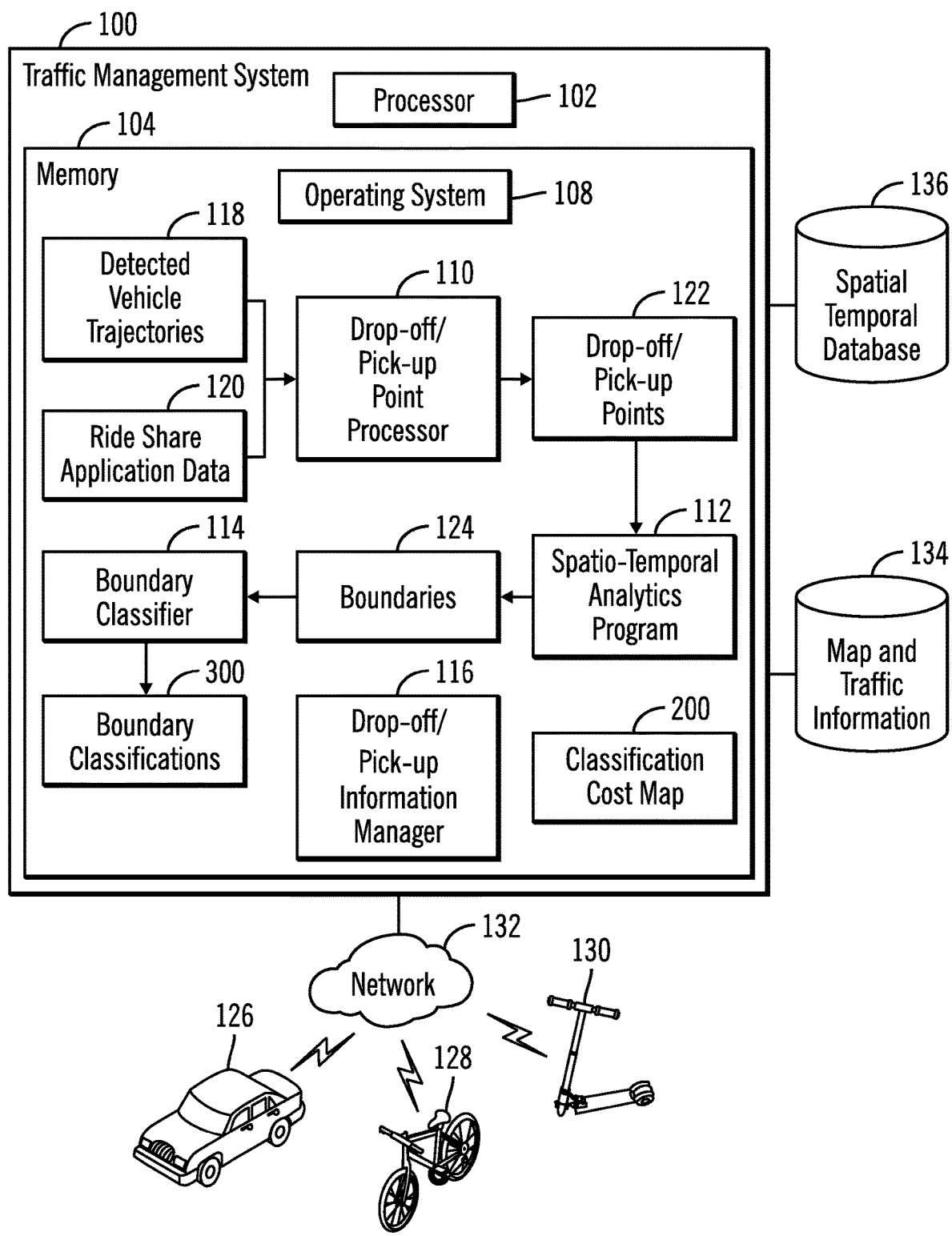
FIG. 1 illustrates an embodiment of a traffic management computing environment.

FIG. 1 illustrates an embodiment of a traffic management system 100 in which embodiments are implemented. The traffic management system 100 includes a processor 102 and a main memory 104. The main memory 104 includes various program components including an operating system 108, a drop-off/pick-up point processor 110, a spatio-temporal analytics program 112, a boundary classifier 114, and a drop-off/pick-up information manager 116.

The drop-off/pick-up point processor 110 receives detected and reported vehicle trajectories 118 and ride share application data 120 about drop-off and/or pick-up activity, also referred to as drop-off/pick-up, and determines drop-off/pick-up points 122. The vehicle trajectories 118 may be determined from sensors in traffic regions to determine movement of vehicles into traffic regions. The vehicle trajectories 118 may also be reported by ride-share applications recording drop-off/pick-ups that are scheduled to occur in near future. The drop-off/pick-up point processor 110 processes the vehicle trajectories 118 to determine which vehicles are performing a drop-off/pick-up in traffic regions so as to determine drop-off/pick-up points in the traffic regions. The drop-off/pick-up point processor 110 may also determine drop-off/pick-up points 122 from ride share data 120, from a ride sharing company, such as Uber Technologies Inc. and Lyft, Inc., that has information from passenger and drive applications on drop-offs/pick-ups in the traffic regions.

The spatio-temporal analytics program 112 performs geo-spatial cluster analysis of the drop-off/pick-up points 122 to determine clusters comprising boundaries 124 of traffic regions, e.g., portions of a curb, street, parking area, etc., having a consistent drop-off/pick-up point density, to determine hot-spots of drop-off/pick-up. The boundary classifier 114 processes the boundaries 124 to determine boundary classifications 300 indicating a relative density of drop-off/pick-up activity for the boundary with respect to other boundaries. The boundary classifications 300 may also indicate demand pricing. If relative density of drop-off/pick-up activity for the boundary is high, then the classification may comprise a higher demand pricing. Whereas, if relative density of drop-off/pick-up activity for the boundary is low, then the classification may comprise a lower demand pricing. In this way, the drop-off/pick-up density in a boundary determines a demand pricing classification, such as surge pricing for very high drop-off/pick-up activity. For instance, a classification may indicate a range of drop-offs/pick-ups per hour in a boundary, e.g., 5-10 drop-off/pick-ups per hour or a cost per drop-off/pick-up, e.g., $1.50 per hour.

The drop-off/pick-up information manager 116 receives requests for costs to perform a drop-off/pick-up from vehicles, such as automobiles 126, bicycles 128, scooters 130, and other vehicle types, over a network 132. A drop-off/pick-up with respect to a bicycle 128 and scooter 130 comprises a user drop-off of a rental bicycle 128 or scooter 130 or a user pick-up of a bicycle 128 or scooter 130 to rent. Further, the vehicles 126 may include delivery vehicles seeking to drop-off or deliver items at the location, as opposed to people. The vehicles 126, 128, and 130 include wireless transmission hardware and software components to communicate requests for information on costs to perform a drop-off/pick-up in boundaries of track regions.

The drop-off/pick-up information manager 116 uses a classification cost map 200 to determine the cost for performing a drop-off/pick-up associated with at least one of a classification of the boundary at which to perform the drop-off/pick-up, a time range in which the drop-off/pick-up is performed, and a vehicle type of the vehicle requesting the drop-off/pick-up information.

The traffic management system 100 may query a map and traffic information database 134 to determine routes, boundaries for a requested destination, and estimated arrival times based on street maps and real-time live traffic information. The map and traffic information database 134 may further include information about "points of interest" that provide additional context about the boundaries to be generated. For example, if a popular drop-off point is a hospital, hotel, airport, concert venue, park, school, etc. and whether the segment is public or private (because charges may not be permitted for private areas). The classifications may further be adjusted by information in the map and traffic information database 134, such as traffic other than drop-off/pick-up activity. There may be different pricing models based on the context of the location, such as for hospitals, hotels, airports, etc.

The traffic management system 100 may store vehicle trajectory information and drop-off/pick-up points 122 in a spatial temporal database 136.

The memory 104 may comprise suitable volatile or non-volatile memory devices.

Generally, program modules, such as the program components 108, 110, 112, 114, 116 may comprise routines, programs, objects, components, logic, data structures, and so on that perform particular tasks or implement particular abstract data types. The program components and hardware devices of the traffic management system 100 of FIG. 1 may be implemented in one or more computer systems, where if they are implemented in multiple computer systems, then the computer systems may communicate over a network.

The program components 108, 110, 112, 114, 116 may be accessed by the processor 102 from the memory 104 to execute. Alternatively, some or all of the program components 108, 110, 112, 114, 116 may be implemented in separate hardware devices, such as Application Specific Integrated Circuit (ASIC) hardware devices.

The functions described as performed by the programs 108, 110, 112, 114, 116 may be implemented as program code in fewer program modules than shown or implemented as program code throughout a greater number of program modules than shown.

The arrows shown in FIG. 1 between the components 108, 110, 112, 114, 116 represent a data flow between the components.

The network 132 may comprise a Storage Area Network (SAN), Local Area Network (LAN), Intranet, the Internet, Wide Area Network (WAN), peer-to-peer network, wireless network, arbitrated loop network, etc.

Figure 2:
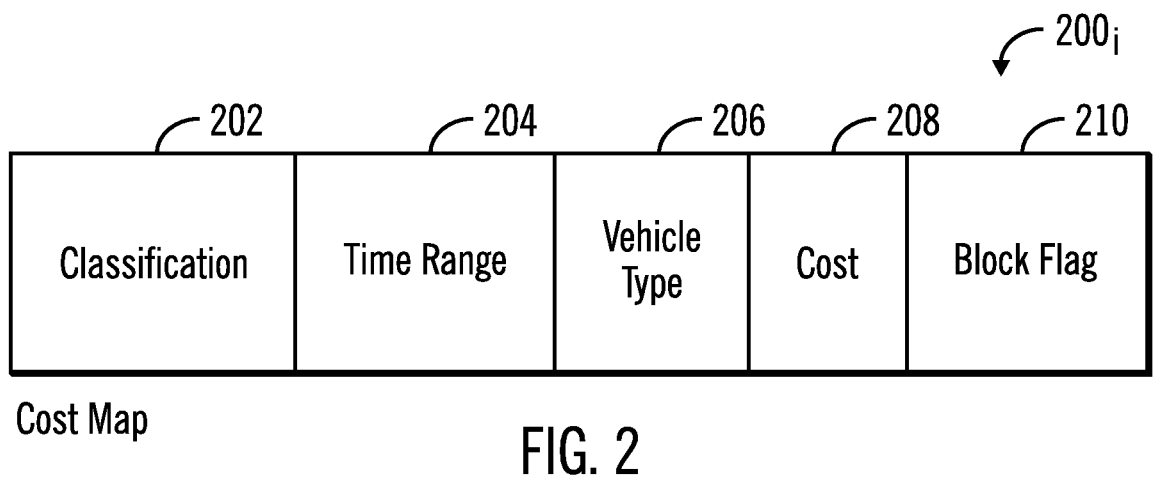
FIG. 2 illustrates an embodiment of a cost map of costs for boundary classifications.

FIG. 2 illustrates an embodiment of an entry 200, in the cost map 200 comprising a classification 202, time range 204, and vehicle type 206 for an associated cost 208 to perform a drop-off or pick-up in boundaries 124 having the classification 202 within the time range 204 with the vehicle type 206. A block flag 210 indicates whether drop-off/pick-up activity should not be allowed in the boundaries 124 having the classification 202 in the time range 204 by the vehicle type 206. The block flag 210 is used to declare a boundary inaccessible, either permanently or temporarily, which would force the user of the data (e.g., passenger, driver, user of vehicle) to perform a drop-off/pick-up in another boundary. In one embodiment, the block flag 210 may be set for a classification associated with a highest density of drop-off/pick-up points so that traffic may be redirected from a boundary having the highest drop-off/pick-up density. Different costs may be provided for a same classification for different time ranges 204 and different vehicle types 206.

The cost 208 or price to perform a drop-off/pick-up in a boundary can vary by time period, such as during rush hour or non-rush hour traffic, and can be based on city planning preferences. The cost 208 may be updated occasionally (such as monthly or daily) or in real-time. In addition, pricing may vary based on predicted demand, with start time windows, to allow for "demand smoothing" to provide lower price points for different boundaries and time periods. This price manipulation through the cost map 200 through market price signaling redirects drop-off/pick-up activity to lower density boundaries in time and/or space.

Further, the cost 208 or price data can be adjusted by the historical data up to that point to reflect current conditions. This would be similar to the surge pricing used by the ride sharing service themselves. Such a feature allows the service to build in these increased usage fees to the surge price. Real-time pricing and adjusted of the cost map 200 has the same effect, which is to level out the demand on the most popular boundary locations, for the time periods in which they are popular. Pricing may be determined from either simple analytics based on a combination of historical data and current trends using data mining and spatio-temporal analytics or artificial intelligence prediction algorithms.

Figure 3:
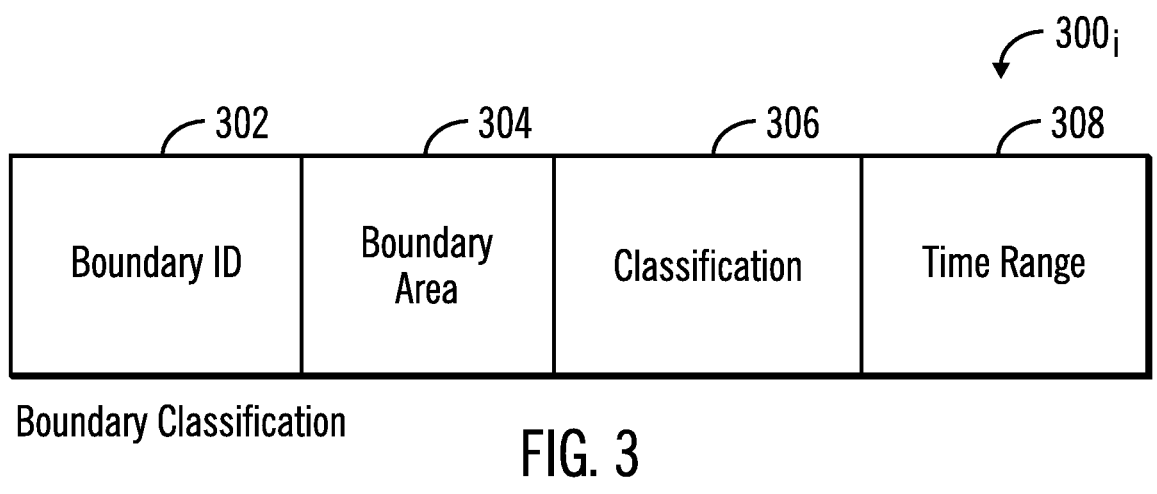
FIG. 3 illustrates an embodiment of a boundary classification providing a classification of a defined boundary of a traffic region.

FIG. 3 illustrates an embodiment of a boundary classification instance $300_i$ of the boundary classifications 300 that provide a boundary identifier 302 for a boundary 124; a boundary area 304 comprising map coordinates of a portion of a traffic region defined by the boundary 302; a classification 306 assigned to the boundary 302; and a time range 308 during which the classification 304 applies to the boundary 302.

In this way, a boundary may be assigned a different classification 304 for different time ranges 308, such that a boundary 302 is classified as having a certain drop-off/pick-up density in one time range and another drop-off/pick-up density in another time range. In a further embodiment, a classification 306 may apply for all time ranges.

The elements shown in FIGS. 2 and 3 are by way of example, and different and additional attributes may be provided for the cost map and boundary classification information.

Figure 4:
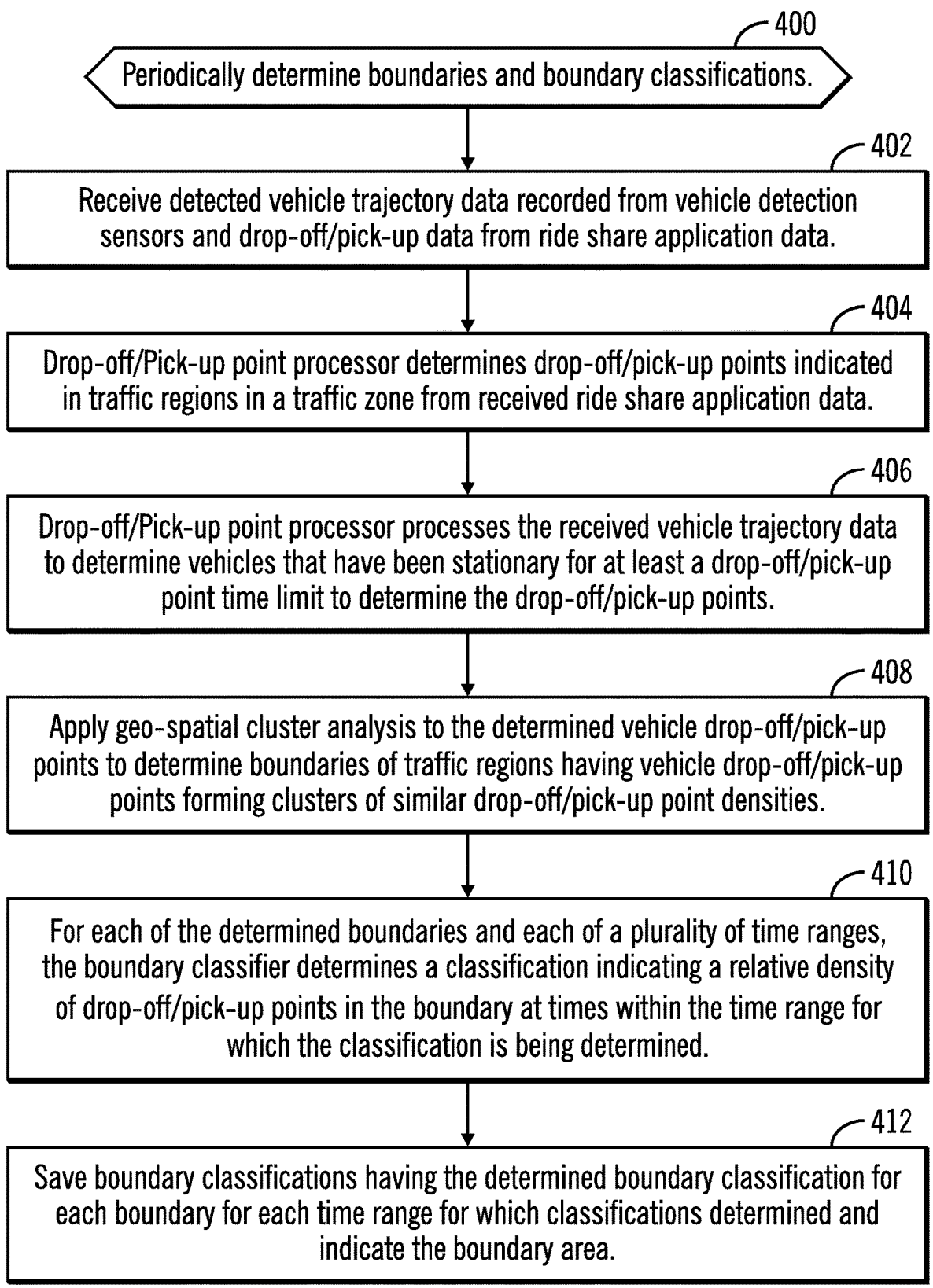
FIG. 4 illustrates an embodiment of operations to determine boundaries of traffic regions and classifications for the boundaries.

FIG. 4 illustrates an embodiment of operations performed by the drop-off/pick-up point processor 110, spatio-temporal analytics program 112, and boundary classifier 114 to determine classifications for boundaries 124 comprising traffic regions in a traffic zone. The operations of FIG. 4 may be performed periodically to update the classification and boundary regions based on changes to drop-off/pick-up patterns in the traffic regions. Upon initiating (at block 400) operations to determine boundaries 124 and boundary classifications $300_i$, the drop-off/pick-up point processor 100 receives (at block 402) vehicle trajectories 118 detected from vehicles entering traffic areas and ride share application data 120 having drop-off/pick-up information. The drop-off/pick-up point processor 110 determines (at block 404) drop-off/pick-up points 122 indicated in traffic regions in a traffic zone from received ride share application data 120. The drop-off/pick-up point processor 110 processes (at block 406) the received vehicle trajectory data 118 to determine vehicles that have been stationary for at least a drop-off/pick-up point time limit to determine drop-off/pick-up points 122. Other techniques may be used to determine vehicles 126, 128, 130 that are involved in a drop-off/pick-up activity, as opposed to other traffic activity, such as passing through a traffic region, stopping at a stop light, etc. The drop-off/pick-up point processor 110 may use machine learning algorithms to determine which vehicle trajectories in a traffic region comprise drop-off/pick-up actions.

The spatio-temporal analytics program 112 applies (at block 408) geo-spatial cluster analysis to the determined vehicle drop-off/pick-up points 122 to determine boundaries 124 of traffic regions having vehicle drop-off/pick-up points forming clusters of similar drop-off/pick-up point densities. Thus, each boundary 124 may have a different dimension or different area of a traffic region, such as sidewalk, parking lot, turn-in area, etc. and each boundary has a density of drop-off/pick-up points. Further, context of the location in the map and traffic information 134, such as points-of-interest, hospitals, airports, etc., may affect the size and dimensions of the boundaries. Techniques other than spatio-temporal analytics may be used to determine boundaries. In further embodiments, boundaries may be determined by expert analysis, either a computer program or a person. All the above mentioned factors, and others, may dynamically determine the size and dimensions of the boundaries 124 of the traffic regions, and the boundaries 124 may change over time as the above factors affecting the size and dimensions of the boundaries change.

For each of the determined boundaries and each of a plurality of time ranges for which classification information is maintained, such as different portions of a day (e.g., morning rush hour, afternoon rush hour, etc.), the boundary classifier 114 determines (at block 410) a classification indicating a relative density of drop-off/pick-up points in the boundary at times within the time range for which the classification is being determined. For instance, different time ranges of drop-off/pick-up densities may be associated with different classifications. The boundary classifier 114 saves (at block 412) boundary classifications $300_i$ having the determined boundary classification 306 for each boundary for each time range 308 for which classifications 306 are determined and indicates the boundary area 304 of the boundary 302 for which the classification was determined in the time range 308.

With the embodiment of FIG. 4, geo-spatial cluster analysis is used to determine boundaries of traffic regions having a common or consistent density of drop-off/pick-up points. The boundaries or regions may further be affected by context of points-of-interest within the boundaries. This analysis allows for determination of those boundaries 124 that represent a density of drop-off/pick-up activity. The density is then classified so that the drop-off/pick-up density classification for different boundaries or traffic regions may then be used to control the flow of further vehicle traffic into boundaries based on their current drop-off/pick-up densities. The boundary classifications may further comprise demand pricing based on the current drop-off/pick-up densities, where relatively higher densities result in higher demand pricing, and lower densities result in lower pricing.

The determination of boundaries 124 may further consider data analysis of historical patterns, such as traffic, ride share patterns, pedestrian movement, and even venue proximity, which factors may be used to adjust the boundaries determined according to drop-off/pick-up points. These additional traffic factors used to determine boundaries of drop-off/pick-up and other traffic density may be determined from the map and traffic information 134.

Boundaries 124 may vary in size based on demand, from partial block to long street or road segments and parking lots, all the way up to complete rural blocks outside the city. They could be determined through historical geospatial cluster analysis of pick-up/drop-off data, or by a transportation subject matter expert. They also can change on some periodic basis as that demand changes over time.

Figure 5:
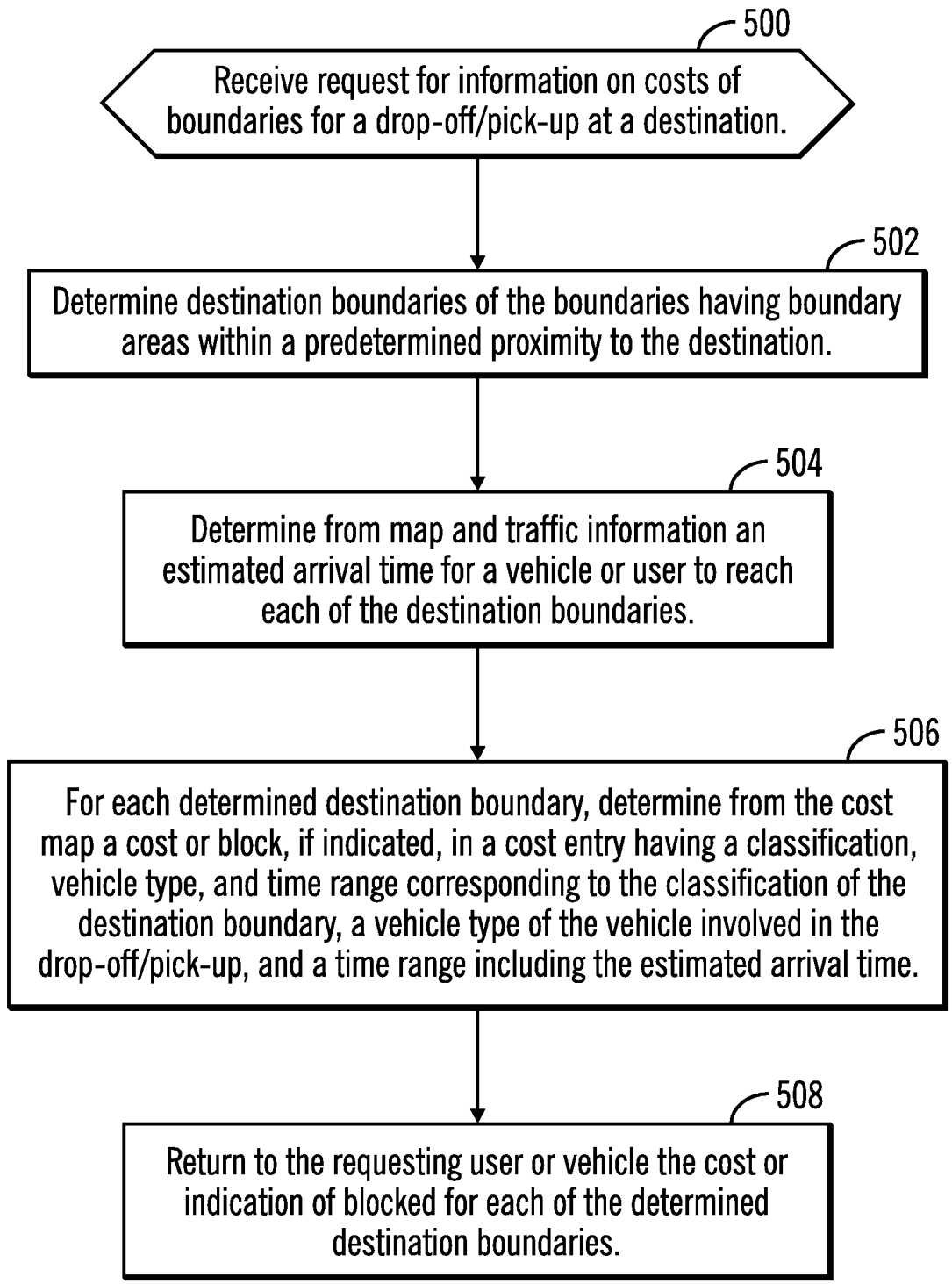
FIG. 5 illustrates an embodiment of operations to process a request for information on costs of boundaries for a drop-off/pick-up at a destination.

FIG. 5 illustrates an embodiment of operations performed by the drop-off/pick-up information manager 116 to process a request for information on costs of boundaries 124 or traffic regions for a drop-off/pick-up at a destination. This request may originate from a user drive sharing application, where the user may comprise a passenger or driver of an automobile 126 involved in a drop-off/pickup or a user that wants to drop-off/pick-up a bicycle 128 or scooter 130. In response to the request (at block 500) for drop-off/pick-up cost information, the drop-off/pick-up information manager 116 determines (at block 502) destination boundaries 124 of the boundaries having boundary areas within a predetermined proximity to the destination. This predetermined proximity may based on an acceptable walking distance from the specified destination, e.g., a distance sufficient for a few minute walk. The drop-off/pick-up information manager 116 determines (at block 504) from the map and traffic information 134 an estimated arrival time for the user requesting the drop-off/pick-up cost to reach each of the destination boundaries. For each determined destination boundary, a determination is made (at block 506) from the cost map 200 of a cost 208 or block 210, if indicated, in a cost entry 200, having a classification 202, time range 204, and vehicle type 206 corresponding to the classification of the destination boundary, a vehicle type of the vehicle involved in the drop-off/pick-up, and a time range including the estimated arrival time. The drop-off/pick-up information manager 116 returns (at block 508) the cost or indication of blocked to the requesting user for each of the determined destination boundaries 508.

With the embodiment of FIG. 5, returning information on the cost, for each destination boundary in proximity to the requested drop-off/pick-up location, allows the user of the ride sharing application to determine which destination boundary to select for a drop-off/pick-up. Further, with the described embodiments, the application of the pricing data is based on the latitude/longitude of the drop-off/pick-up point, as determined in the riding sharing mobile application location services. This point is used to determine closest pricing boundary proximity during the initial ride request, which means the usage fee can be included into the ride service pricing calculation prior to acceptance. Another use of the boundary pricing would be for other vehicle types, such as rented scooter and city bicycles. Pricing for the route on sidewalks, as well as pick-up and drop-off locations could help manage congestion and safety concerns.

Figure 6:
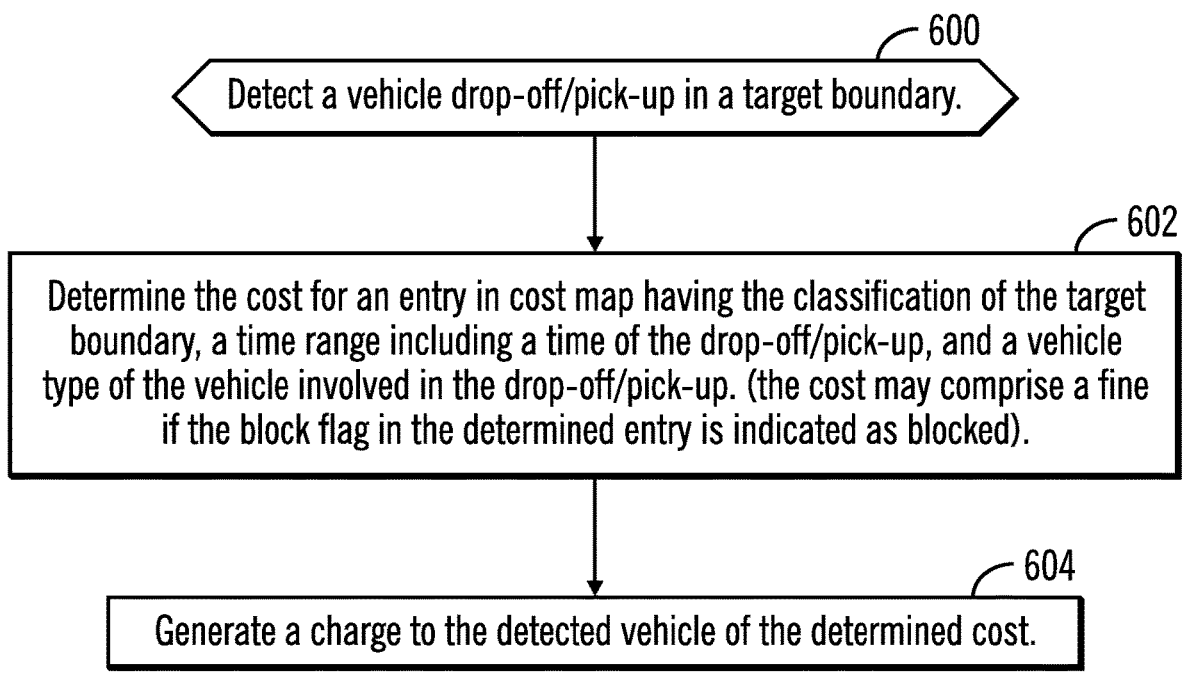
FIG. 6 illustrates an embodiment of operations to detect a drop-off/pick-up in a target boundary.

In further embodiments, the cost for the destination boundary drop-off/pick-up may incorporate future demand expectations for the destination boundary in addition to the current drop-off/pick-up density in the destination boundary. For instance, if expected drop-off/pick-up density for the destination boundary in the next half-hour is higher than the current density, then that higher density for the future may increase the cost for the drop-off/pick-up. Likewise, if expected drop-off/pick-up density for the destination boundary in the next half-hour is lower than the current density, then that lower density for the future may lower the cost for the drop-off/pick-up FIG. 6 illustrates an embodiment of operations performed by the drop-off/pick-up information manager 116 to charge the user of a vehicle involved in a drop-off/pick-up in a boundary or traffic region. The drop-off/pick-up information manager 116 receives (at block 600) information on a vehicle detected performing a drop-off/pick-up in a target boundary 124T of the determined boundaries 124. The information may be received from sensors or cameras detecting a ride share vehicle performing a drop-off/pick-up or a user performing a drop-off/pick-up with respect to a vehicle, such as a bicycle 128 and scooter 130. The information may further be received from a ride sharing application reporting a scheduled drop-off/pick-up. The drop-off/pick-up information manager 116 determines (at block 602) the cost for an entry 200, in the cost map 200 having the classification 202 of the target boundary 124T, a time range 204 including a time of the drop-off/pick-up, and a vehicle type 206 of the vehicle 126, 128, 130 involved in the drop-off/pick-up. The cost 208 may comprise a fine if the block flag 210 in the determined entry 200, indicates drop-off/pick-up activity is not allowed in the boundary. A charge is generated (at block 604) to the detected vehicle of the determined cost 208. The charge may be applied to an account of the passenger or user involved in the drop-off/pick-up.

In the above embodiments, the cost may be associated with a classification, time period, and vehicle type. In further embodiments, the cost may be associated with one or more of a classification, time period, and vehicle type, and the selection of a cost is based on the one or more of the classification, time period, and vehicle type for a drop-off/pick-up.

With the embodiment of FIG. 6, the cost map information may be used to determine a cost to charge a user entering a defined boundary 124 for a drop-off/pick-up. This allows the city or other system to use pricing to control behavior and re-direct a requested drop-off/pick-up to boundaries or traffic regions experiencing lower drop-off/pick-up or lower traffic activity to mitigate traffic problems.

In further embodiments, the city may charge the cost when the charge is generated at block 604 to the detected vehicle. The city may bill the rider being dropped-off/picked-up or charge the rideshare service company for the charge that is generated. In yet further embodiments, a reservation for a drop-off/pick-up slot within the target boundary 124T may be reserved for the driver or person requesting the drop-off/pick-up to occur within the expected drop-off/pick-up time.

Applications, such as smartphone applications, used by riders and/or ride sharing services may register drop-off/pick-ups with local authorities to enable local authorities to track drop-off/pick-up activities and then charge when the activity is completed.

The described embodiments may be utilized by city planners to address two correlated traffic issues, one related to drivers stopping for pick-up/drop-off in random locations along city streets and a second related to reduced use of city-owned parking spaces and their associated fees. With the described embodiments, the city may recoup lost parking space revenue by assigning costs to use to perform a drop-off/pick-up in boundaries of traffic regions that is based on the density of the boundaries, so that a higher cost is applied to drop-offs/pick-ups in higher density boundaries of traffic regions.

Further, a large number of rides start and stop in downtown areas, where street parking and open curb space is limited and is in high demand, especially during peak traffic hours. As a result, drivers stop in regular lanes, slowing traffic or stop in parking spaces or in areas prohibited from stopping, which has undesirable side effects. With the described embodiments, assigning higher costs to higher drop-off/pick-up density boundaries, will redirect traffic away from the higher cost higher density boundaries to lower cost boundaries of traffic regions. Using pricing to redirect traffic is more effective than trying to police drop-off/pick-up activity in high density traffic regions.

Further, with described embodiments, cities may offset the loss of revenue from reduced usage of parking meters by providing a technique to impose costs on drop-off/pick-up activity in traffic regions. With the described embodiments, ride sharing services may maintain their current user experience (for both the driver and the rider), while providing a demand-leveling impact to redirect drop-off/pick-up traffic to less trafficked locations and provide a new revenue source for the city's transportation budget which can be applied to improving transportation infrastructure. This, in turn, benefits the ride sharing services and citizens for sustainable and continuous improvement in mobility.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
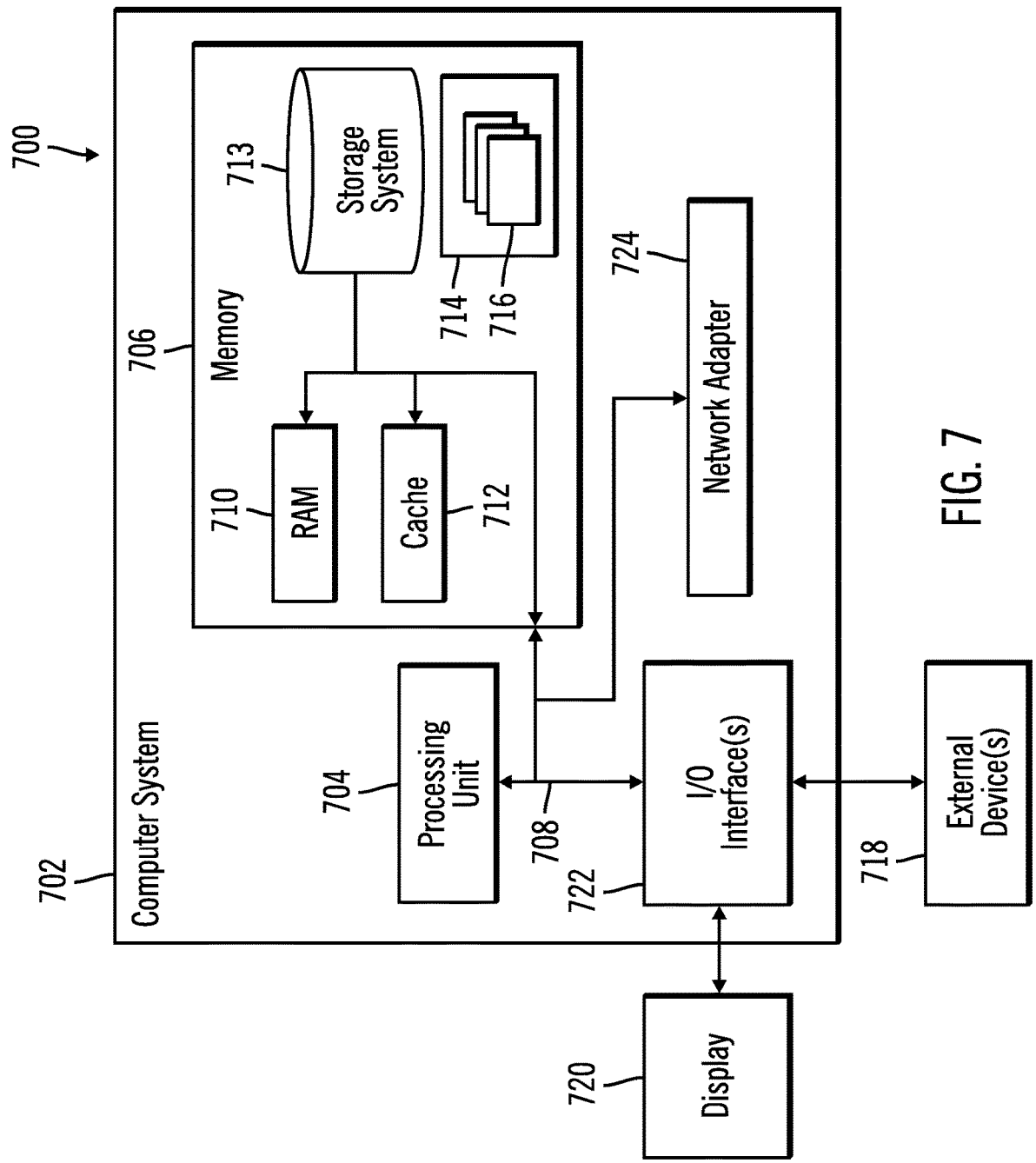
FIG. 7 illustrates a computing environment in which the components of FIG. 1 may be implemented.

The computational components of FIG. 1, including the traffic management system, the vehicles 126, 18, 130, and the map and traffic information 134 may be implemented in one or more computer systems, such as the computer system 702 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

Figure 8:
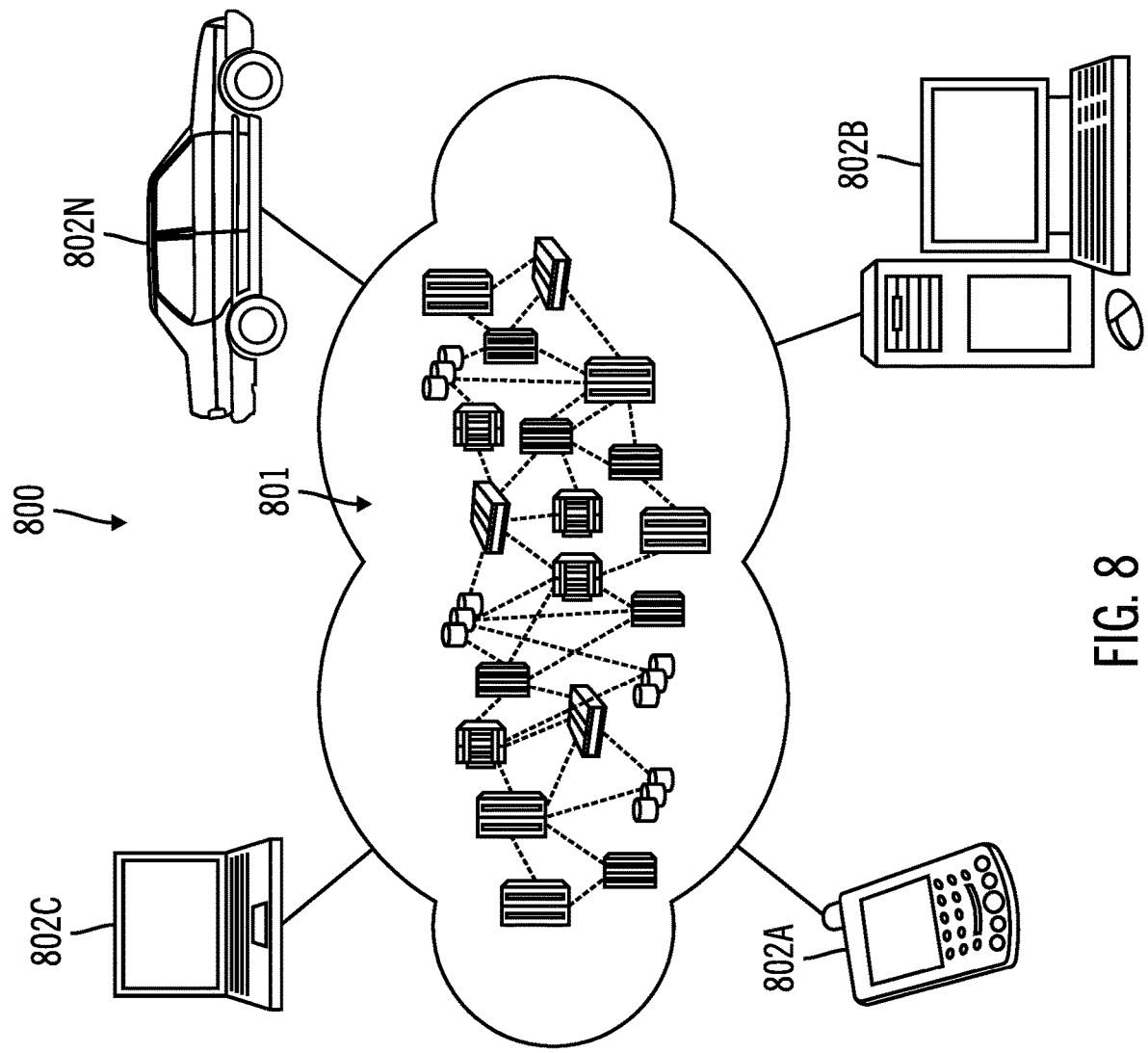
FIG. 8 depicts an embodiment of a cloud computing environment.

Referring now to FIG. 8, illustrative cloud computing environment 800 is depicted. As shown, cloud computing environment 800 comprises one or more cloud computing nodes 801 with which local computing devices used by cloud consumers, such as, for example, personal digital assistant (PDA) or cellular telephone 802A, desktop computer 802B, laptop computer 802C, and/or automobile computer system 802N, such as vehicles 126, 128, 130 in FIG. 1, may communicate. Nodes 801 may communicate with one another. They may be grouped (not shown) physically or virtually, in one or more networks, such as Private, Community, Public, or Hybrid clouds as described hereinabove, or a combination thereof. This allows cloud computing environment 800 to offer infrastructure, platforms and/or software as services for which a cloud consumer does not need to maintain resources on a local computing device, such as the case with. It is understood that the types of computing devices 802A-N shown in FIG. 8 are intended to be illustrative only and that computing nodes 801 and cloud computing environment 800 can communicate with any type of computerized device over any type of network and/or network addressable connection (e.g., using a web browser).

Figure 9:
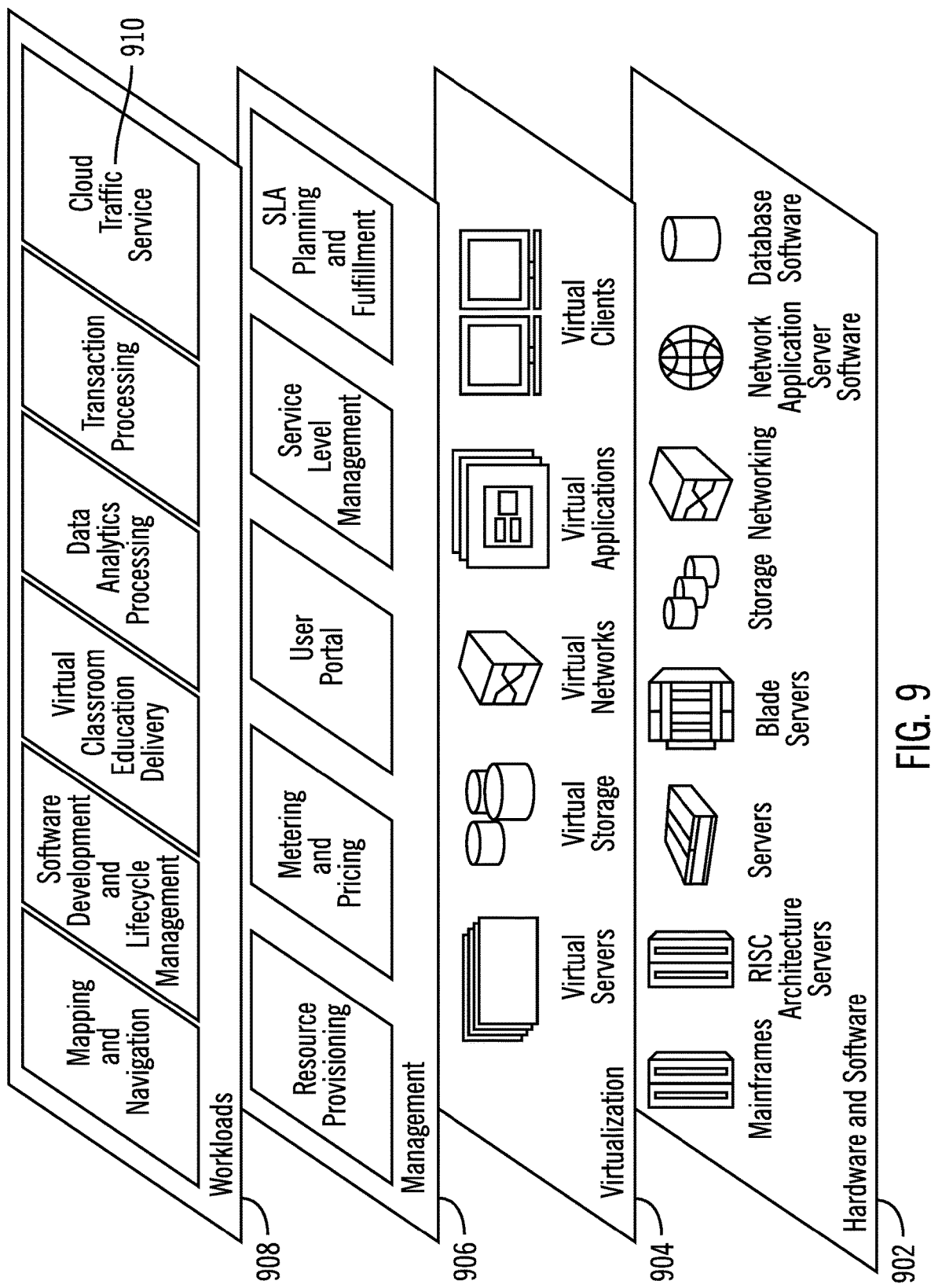
FIG. 9 depicts an embodiment of abstraction model layers of a cloud computing environment.

Referring now to FIG. 9, a set of functional abstraction layers provided by cloud computing environment 900 (FIG. 9) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 902 includes hardware and software components. Examples of hardware components include: mainframes; RISC (Reduced Instruction Set Computer) architecture based servers; storage devices; networks and networking components. In some embodiments, software components include network application server software.

Virtualization layer 904 provides an abstraction layer from which the following examples of virtual entities may be provided: virtual servers; virtual storage; virtual networks, including virtual private networks; virtual applications and operating systems; and virtual clients.

In one example, management layer 906 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 908 provides examples of functionality for which the cloud computing environment may be utilized. Examples of workloads and functions which may be provided from this layer include: mapping and navigation; software development and lifecycle management; virtual classroom education delivery; data analytics processing; transaction processing; and cloud based traffic management services 910 as described above with respect to the traffic management system 100 described above.

The letter designators, such as i, is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for providing traffic information to control drop-off/pick-up activity in traffic regions, wherein the computer program product comprises a computer readable storage medium having program instructions embodied therewith that when executed cause operations, the operations comprising:

determining, by a drop-off/pick-up point processor, drop-off/pick-up points for vehicles in traffic regions in which vehicles dropped-off and/or picked-up passengers from vehicle trajectories received from at least one of sensors and ride sharing applications deployed in the traffic regions to detect vehicles and duration of time the vehicles spent stationary in the traffic regions, wherein vehicles that are stationary within the traffic regions for more than a drop- off/pick-up time limit are deemed to represent drop-off/pick-up points;

applying, by a spatio-temporal analytics program, geo-spatial cluster analysis to the determined drop-off/pick-up points and querying a database of map and traffic information to determine context of the traffic regions to determine boundaries of the traffic regions having drop-off/pick-up points forming clusters of similar drop-off/pick-up point densities;

determining, by a boundary classifier, classifications for the boundaries, wherein the determined classifications indicate relative densities of drop-off/pick-up points among the boundaries;

receiving a request for information on boundaries for a drop-off/pick-up at a destination in the traffic regions for a target vehicle;

determining destination boundaries of the boundaries having boundary areas within a specified proximity to the destination;

determining classification related information associated with classifications corresponding to the classifications of the destination boundaries;

communicating the determined classification related information for the destination boundaries to a user, comprising a driver or passenger, involved with the drop-off/pick-up at the destination to use to select one of the destination boundaries for the drop-off/pick up by the target vehicle;

updating information on the boundaries and the classifications based on changes to drop-off/pick-up patterns in the traffic regions and vehicle trajectories detected from one or more sensors in traffic regions and received from the ride sharing applications; and in response to updating the classifications and boundaries, re-directing a requested drop-off/pick-up to traffic regions experiencing lower drop-off/pick-up or lower traffic activity to mitigate traffic problems.

2. The computer program product of claim 1, wherein the determining the classification related information further comprises:

determining, from a cost map associating costs with classifications, costs to the target vehicle of dropping-off/picking-up a passenger in the destination boundaries, wherein classifications representing higher densities of drop-off/pick-up points have higher costs than classifications representing lower densities of drop-off/pick-up points, and wherein the classification related information communicated to the target vehicle for which the destination boundaries were determined comprises the costs determined for the destination boundaries.

3. The computer program product of claim 2, wherein the operations further comprise:

detecting that a vehicle performed a drop-off/pick-up in a destination boundary;

determining a cost associated with a classification of the destination boundary in which the performed drop-off/pick-up is detected; and generating a charge to the vehicle that performed the drop-off/pick-up of the determined cost.

4. The computer program product of claim 2, wherein different costs are provided for the classifications for different vehicle types, wherein a cost for dropping-off and/or picking-up in a target boundary is based on a vehicle type of the target vehicle, wherein the vehicle types are members of a set of vehicle types comprising automobiles, scooters, and bicycles.

5. The computer program product of claim 1, wherein the determining the classification related information for each of the determined classifications comprises:

determining, from the database of map and traffic information, estimated arrival times for the target vehicle to reach the destination boundaries based on a current position of the target vehicle; and determining costs associated with the classifications of the destination boundaries for the estimated arrival time, wherein the costs vary depending on the estimated arrival times for the destination boundaries, wherein the classification related information for the destination boundaries communicated to the target vehicle comprise the determined costs.

6. The computer program product of claim 1, wherein the determined boundaries vary in size based on the geo-spatial cluster analysis of the drop-off/pick-up point densities, wherein the determined boundaries comprise a portion of at least multiple of a block street, road segment, parking lot, and curbside.

7. The computer program product of claim 1, wherein the communicating the classification related information for a highest density classification associated with a highest density of drop-off/pick-up points indicates to not perform a drop-off/pick-up in any of the determined boundaries associated with the highest density classification.

8. A system for providing traffic information to manage drop-off/pick-up activity in traffic regions, comprising:
a processor; and
a computer readable storage medium having program instructions embodied therewith that when executed by the processor cause operations, the operations comprising:
determining, by a drop-off/pick-up point processor, drop-off/pick-up points for vehicles in traffic regions in which vehicles dropped-off and/or picked-up passengers from vehicle trajectories received from at least one of sensors and ride sharing applications deployed in the traffic regions to detect vehicles and duration of time the vehicles spent stationary in the traffic regions, wherein vehicles that are stationary within the traffic regions for more than a drop-off/pick-up time limit are deemed to represent drop-off/pick-up points;
applying, by a spatio-temporal analytics program, geo-spatial cluster analysis to the determined drop-off/pick-up points and querying a database of map and traffic information to determine context of the traffic regions to determine boundaries of the traffic regions having drop-off/pick-up points forming clusters of similar drop-off/pick-up point densities;
determining, by a boundary classifier, classifications for the boundaries, wherein the determined classifications indicate a relative densities of drop-off/pick-up points among the boundaries; receiving a request for information on boundaries for a drop-off/pick-up at a destination in the traffic regions for a target vehicle;
determining destination boundaries of the boundaries having boundary areas within a specified proximity to the destination;
determining classification related information associated with classifications corresponding to the classifications of the destination boundaries;
communicating the determined classification related information for the destination boundaries to a user, comprising a driver or passenger, involved with the drop-off/pick-up at the destination to use to select one of the destination boundaries for the drop-off/pick up by the target vehicle;
updating information on the boundaries and the classifications based on changes to drop-off/pick-up patterns in the traffic regions and vehicle trajectories detected from one or more sensors in traffic regions and received from the ride sharing applications; and
in response to updating the classifications and boundaries, re-directing a requested drop-off/pick-up to traffic regions experiencing lower drop-off/pick-up or lower traffic activity to mitigate traffic problems.

9. The system of claim 8, wherein the determining the classification related information further comprises:
determining, from a cost map associating costs with classifications, costs to the target vehicle of dropping-off/picking-up a passenger in the destination boundaries, wherein classifications representing higher densities of drop-off/pick-up points have higher costs than classifications representing lower densities of drop-off/pick-up points, and wherein the classification related information communicated to the target vehicle for which the destination boundaries were determined comprises the costs determined for the destination boundaries.

10. The system of claim 9, wherein the operations further comprise:
detecting that a vehicle performed a drop-off/pick-up in a destination boundary;
determining a cost associated with a classification of the destination boundary in which the performed drop-off/pick-up is detected; and
generating a charge to the vehicle that performed the drop-off/pick-up of the determined cost.

11. The system of claim 8, wherein the determining the classification related information for each of the determined classifications comprises:
determining, from the database of map and traffic information, estimated arrival times for the target vehicle to reach the destination boundaries based on a current position of the target vehicle; and
determining costs associated with the classifications of the destination boundaries for the estimated arrival time, wherein the costs vary depending on the estimated arrival times for the destination boundaries, wherein the classification related information for the destination boundaries communicated to the target vehicle comprise the determined costs.

12. The system of claim 8, wherein the determined boundaries vary in size based on the geo-spatial cluster analysis of the drop-off/pick-up point densities, wherein the determined boundaries comprise a portion of at least multiple of a block street, road segment, parking lot, and curbside.

13. A computer implemented method for providing traffic information to manage drop-off/pick-up activity in traffic regions, comprising:
determining, by a drop-off/pick-up point processor, drop-off/pick-up points for vehicles in traffic regions in which vehicles dropped-off and/or picked-up passengers from vehicle trajectories received from at least one of sensors and ride sharing applications deployed in the traffic regions to detect vehicles and duration of time the vehicles spent stationary in the traffic regions, wherein vehicles that are stationary within the traffic regions for more than a drop-off/pick-up time limit are deemed to represent drop-off/pick-up points;
applying, by a spatio-temporal analytics program, geo-spatial cluster analysis to the determined drop-off/pick-up points and querying a database of map and traffic information to determine context of the traffic regions to determine boundaries of the traffic regions having drop-off/pick-up points forming clusters of similar drop-off/pick-up point densities;

determining, by a boundary classifier, classifications for the boundaries, wherein the determined classifications indicate relative densities of drop-off/pick-up points among the boundaries;

receiving a request for information on boundaries for a drop-off/pick-up at a destination in the traffic regions for a target vehicle;

determining destination boundaries of the boundaries having boundary areas within a specified proximity to the destination;

determining classification related information associated with classifications corresponding to the classifications of the destination boundaries;

communicating the determined classification related information for the destination boundaries to a user, comprising a driver or passenger, involved with the drop-off/pick-up at the destination to use to select one of the destination boundaries for the drop-off/pick up by the target vehicle;

updating information on the boundaries and the classifications based on changes to drop-off/pick-up patterns in the traffic regions and vehicle trajectories detected from one or more sensors in traffic regions and received from the ride sharing applications; and in response to updating the classifications and boundaries, re-directing a requested drop-off/pick-up to traffic regions experiencing lower drop-off/pick-up or lower traffic activity to mitigate traffic problems.

14. The method of claim 13, wherein the determining the classification related information further comprises:

determining destination boundaries within a predetermined proximity to a destination of a target vehicle; and for each destination boundary of the destination boundaries, determining, from a cost map associating costs with classifications, a cost to the target vehicle of dropping-off/picking-up a passenger in the destination boundary, wherein classifications representing higher densities of drop-off/pick-up points have higher costs than classifications representing lower densities of drop-off/pick-up points, and wherein the classification related information communicated to the target vehicle for which the destination boundaries were determined comprises the costs determined for the destination boundaries.

15. The method of claim 14, further comprising:

detecting that a vehicle performed a drop-off/pick-up in a destination boundary;

determining a cost associated with a classification of the destination boundary in which the performed drop-off/pick-up is detected; and generating a charge to the vehicle that performed the drop-off/pick-up of the determined cost.

16. The method of claim 13, wherein the determining the classification related information for each of the determined classifications comprises:

determining target boundaries within a predetermined proximity to a destination of a target vehicle;

determining, from the database of map and traffic information, an estimated arrival time for the target vehicle to reach each of the target boundaries based on a current position of the target vehicle; and for each of the target boundaries, determining a cost associated with a classification of the target boundary for the estimated arrival time, wherein the cost varies depending on the estimated arrival time for the target boundary, wherein the classification related information for each target boundary communicated to the target vehicle comprises the determined cost.

* * * * *